United States Patent [19]
Hoffmann et al.

[11] 3,867,459
[45] Feb. 18, 1975

[54] PRODUCTION OF PENTA-2,4-DIEN-1-ALS AND RELATED TRIENALS

[75] Inventors: Werner Hoffmann, Ludwigshafen; Walter Himmele, Walldorf; Werner Aquila, Ludwigshafen, all of Germany

[73] Assignee: Basf Aktiengesellschaft, Ludwigshafen/Rhein, Germany

[22] Filed: Nov. 5, 1973

[21] Appl. No.: 412,733

Related U.S. Application Data

[63] Continuation-in-part of Ser. No. 79,299, Oct. 8, 1970, abandoned.

[30] Foreign Application Priority Data
Oct. 15, 1969  Germany............................ 1951883

[52] U.S. Cl.............. 260/601 R, 252/522, 260/602, 260/638 R, 426/22

[51] Int. Cl....................... C07c 47/20, C07c 47/26
[58] Field of Search......................... 260/601 R, 602

[56] References Cited
OTHER PUBLICATIONS

"Beilsteins Handbuck der Organ Chemie" Band I, Hauptwerk, pp. 757–758 (1918).
J. L. Simonsen, "The Terpenes", Vol. I, p. 88 (1953).

*Primary Examiner*—Joseph E. Evans
*Assistant Examiner*—D. B. Springer
*Attorney, Agent, or Firm*—Johnston, Keil, Thompson & Shurtleff

[57] ABSTRACT

Manufacture of penta-2,4-dien-1-als comprising the reaction of propargyl alcohols with α-formylcarboxylic esters at temperatures of from 100° to 350° C. Penta-2,4-dien-1-als are odorants.

6 Claims, No Drawings

PRODUCTION OF PENTA-2,4-DIEN-1-ALS AND RELATED TRIENALS

This application is a continuation in part of application Ser. No. 79,299 filed Oct. 8, 1970, and now abandoned.

The invention relates to a process for the manufacture of penta-2,4-dien-1-als by reacting substituted propargyl alcohols with α-formylcarboxylic esters.

It is an object of the invention to provide a process which produces a large number of penta-2,4-dien-1-als not hitherto available. It is another object of the invention to provide a process which produces good yields.

In accordance with the present invention these and other objects and advantageous are achieved in a process for the manufacture of penta-2,4-dien-1-als of the general formula:

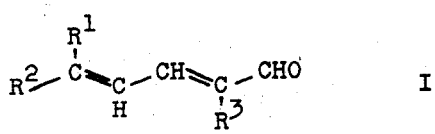

in which $R^1$ stands for a hydrogen atom or a methyl radical, $R^2$ stands for an aliphatic hydrocarbon radical of from one to nine carbon atoms, which radical may contain one or two olefinically double bonds and which may bear from one to three substituents consisting of the group which comprises methyl, ethyl and methoxy and in which $R^3$ stands for alkyl having from one to four carbon atoms, which comprises reacting propargyl alcohols of the general formula:

in which $R^1$ and $R^2$ have the meanings given above, with α-formylcarboxylic esters of the general formula:

in which $R^3$ has the meaning stated above and $R^4$ stands for alkyl of from one to four carbon atoms at temperatures ranging from 100° to 350° C and from 1 to 5 moles of α-formyl carboxylic esters being applied per mole of said propargyl alcohols.

Preferred starting materials of formula II are those in which $R^1$ stands for a hydrogen atom or a methyl radical, $R^2$ stands for 4-methylpent-4-en-1-yl, 4-methyl-4-methoxypent-1-yl, 4-methylpent-1-yl, 4,8-dimethylnona-3,7-dien-1-yl or 2-ethylpent-1-yl. Examples of suitable starting materials are: 3,7-dimethyloct-7-en-1-yn-3-ol; 7-methoxy-3,7-dimethyloct-1-yn-3-ol; 3,7-dimethyloct-6-en-1-yn-3-ol; dehydronerolidol; 4-ethyloct-1-yn-3-ol; dehydroisophytol; 3-methylpent-1-yn-3-ol or 3-methylbut-1-yn-3-ol.

In the preferred starting materials of formula III, $R^3$ stands for alkyl of from one to four carbon atoms, and $R^4$ stands for alkyl of from one to four carbon atoms. Suitable starting materials are, for example, methyl-α-formylpropionate, n-butyl α-formylpropionate, methyl α-formylbutyrate and n-butyl α-formylbutyrate.

It is advantageous to use from 1 to 5 moles of starting material of formula III per mole of starting material of formula II. Particularly good results are obtained when from 1.2 to 2.5 moles of starting material of formula III are used per mole of starting material of formula II.

The reaction is carried out at temperatures ranging from 100° to 350° C. Temperatures of from 120° to 220° C are particularly beneficial. The reaction is generally carried out at atmospheric pressure, but it is possible to use pressures of from 100 mm of Hg to 10 atmospheres.

In general no solvents are used in carrying out the reaction. However, solvents and diluents may be used if desired, for example inert high-boiling hydrocarbons such as perhydro and tetrahydro naphthalene, dimethyl formamide and N-methyl pyrrolidone.

The process of the invention is carried out, for example, by placing the starting materials of formulae II and III in the desired proportions, optionally together with solvents, in a reaction vessel and heating to the temperatures specified. Since alcohol and carbon dioxide are eliminated during the reaction, it is easy to determine the conclusion of the reaction. After the removal of any solvents the reaction mixture is worked up by known methods, for example, by fractional distillation. Unconverted starting materials may be recycled to the reaction. The reaction may be carried out continuously by simple means.

The compounds prepared by the process of the invention are odorants. They are distinguished particularly by a fruity odor and taste; 2,5,9-trimethyldeca-2,4,9-trien-1-al, for example, has a pronounced orange odor and taste and is used in the beverage industry for making appropriate fruit drinks.

The process of the invention is illustrated in the following Examples.

EXAMPLE 1

A mixture of 76 g of 3,7-dimethyloct-7-en-1-yn-3-ol and 87 g of methyl α-formylpropionate is heated at 160° C. The methanol eliminated is continuously distilled off via a column. During the reaction the temperature is raised to 200° C. The reaction is complete after about 3 hours. The resulting reaction mixture is worked up by fractional distillation. There are thus obtained 71 g of 2,5,9-trimethyldeca-2,4,9-trien-1-al (76% of theory), b.p. 98°–99° C/0.01 mm, refractive index $n_D^{25}$ 1.5299. The product has a distinctly fruity odor resembling that of raspberries.

EXAMPLE 2

A mixture of 92 g of 7-methoxy-3,7-dimethyloct-1-yn-3-ol and 87 g of methyl α-formylpropionate is heated as in Example 1 for 5 hours at temperatures ranging from 150° to 200° C. After fractional distillation of the reaction mixture there are obtained 79 g of 9-methoxy-2,5,9-trimethyldeca-2,4-dien-1-al (74% of theory), b.p. 109°–112° C/0.5 mm, refractive index $n_D^{25}$ 1.5165.

EXAMPLE 3

A mixture of 77 g of 3,7-dimethyl-oct-1-yn-3-ol and 87 g of methyl α-formylpropionate is heated as in Example 1 for 3 hours at temperatures ranging from 155° C to 210° C. After fractional distillation of the reaction mixture there are obtained 69 g of 2,5,9-trimethyldeca-2,4-dien-1-al (73% of theory), b.p. 78°–81°C/0.18 mm, refractive index $n_D^{25}$ 1.5132.

EXAMPLE 4

A mixture of 110 g of dehydronerolidol and 87 g of methyl α-formylpropionate is heated as in Example 1 for 2 hours at from 180° to 200°C. After fractional distillation of the reaction mixture there is a yield of 63% of 2,5,9,13-tetramethyltetradeca-2,4,8,11-tetraen-1-al, b.p. 125°–127° C/0.02 mm, refractive index $n_D^{25}$ 1.5190.

EXAMPLE 5

A mixture of 77 g of 4-ethyloct-1-yn-3-ol and 87 g of methyl α-formylpropionate is heated for 5 hours at temperatures ranging from 145° to 220° C. After fractional distillation of the reaction mixture there is obtained a yield of 68% of 6-ethyl-2-methyldeca-2,4-dien-1-al, b.p. 74°–78° C/0.2 mm, referactive index $n_D^{25}$ 1.5148.

We claim:

1. A process for the manufacture of a penta-2,4-dien-1-al of the formula

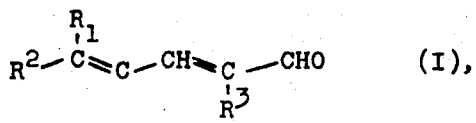

in which $R^1$ stands for hydrogen or methyl, $R^2$ stands for an aliphatic hydrocarbon radical of one to nine carbon atoms, which radical may contain one or two olefinically unsaturated double bonds and which may bear from one to three substituents selected from the group consisting of methyl, ethyl and methoxy and in which $R^3$ stands for alkyl of one to four carbon atoms, which process comprises: contacting a propargyl alcohol of the formula

in which $R^1$ and $R^2$ have the meanings given above, with an α-formylcarboxylic ester of the formula

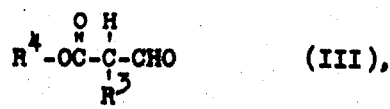

in which $R^3$ has the meaning given above and $R^4$ stands for alkyl of one to four carbon atoms, at a temperature of from 100° to 350° C. and from 1 to 5 moles of an α-formyl carboxylic ester are used per mole of said propargyl alcohol.

2. 2,5,9-Trimethyldeca-2,4,9-trien-1-al.

3. A process as claimed in claim 1 wherein the starting material is a propargyl alcohol of the formula

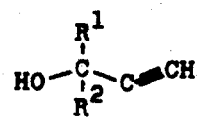

in which $R^1$ stands for hydrogen or methyl and $R^2$ stands for a radical selected from the group consisting of 4-methylpent-4-en-1-yl, 4-methyl-4-methoxypent-1-yl, 4-methylpent-1-yl, 4,8-dimethylnona-3,7dien-1-yl or 2-ethylpent-1-yl.

4. A process as claimed in claim 1 wherein methyl α-formylpropionate is used.

5. A process as claimed in claim 1 wherein a temperature of from 120° to 220° C is used.

6. A process as claimed in claim 1 wherein from 1.2 to 2.5 moles of an α-formylcarboxylic ester are used per mole of the propargyl alcohol.

* * * * *